United States Patent [19]
Hobson

[11] Patent Number: 5,645,733
[45] Date of Patent: Jul. 8, 1997

[54] HYDROCARBON REMOVAL APPARATUS AND METHOD

[75] Inventor: Mark Thomas Hobson, Chagrin Falls, Ohio

[73] Assignee: Abanaki Corporation, Auburn, Ohio

[21] Appl. No.: 442,388

[22] Filed: May 16, 1995

[51] Int. Cl.$^6$ ........................................... C02F 1/40
[52] U.S. Cl. ................... 210/776; 210/187; 210/242.3; 210/526; 210/540
[58] Field of Search .................. 210/776, 242.3, 210/242.4, 523, 923, 924, 526, 179, 187, 540

[56] References Cited

U.S. PATENT DOCUMENTS

| | | |
|---|---|---|
| 3,338,414 | 8/1967 | Lifke et al. .................... 210/923 |
| 3,695,451 | 10/1972 | Schmidt, Jr. et al. ........... 210/526 |
| 4,039,454 | 8/1977 | Miller et al. .................. 210/242.3 |
| 4,089,784 | 5/1978 | Ettelt et al. ................... 210/526 |
| 4,582,604 | 4/1986 | Bashaw ......................... 210/924 |
| 4,652,372 | 3/1987 | Threadgill ..................... 210/242.3 |
| 4,876,011 | 10/1989 | Betts et al. ................... 210/526 |
| 4,983,284 | 1/1991 | Batten ......................... 210/187 |
| 5,015,378 | 5/1991 | Lewan et al. ................... 210/923 |
| 5,062,953 | 11/1991 | Lewan ......................... 210/242.4 |
| 5,080,781 | 1/1992 | Evins, IV ...................... 210/170 |
| 5,089,121 | 2/1992 | McWhinnie ..................... 210/242.3 |
| 5,378,371 | 1/1995 | Hobson ........................ 210/242.4 |

FOREIGN PATENT DOCUMENTS

| | | |
|---|---|---|
| 2041231 | 9/1980 | United Kingdom . |
| 2221403 | 2/1990 | United Kingdom . |
| 2254801 | 10/1992 | United Kingdom . |

*Primary Examiner*—Christopher Upton
*Attorney, Agent, or Firm*—Watts, Hoffmann, Fisher & Heinke Co., L.P.A.

[57] ABSTRACT

A belt type oil and grease skimmer for removing hydrocarbon contaminants from surfaces of bodies of water is disclosed. The skimmer includes a housing and frame structure for positioning above a contaminated body of water. An idler roll and a coating nip roll pair are rotatively mounted on the structure for rotation about generally horizontal axes when the skimmer is in use. An endless belt is trained over the idler roll and between the nip rolls and is suspended in a contaminated body of water when the skimmer is in use. A pair of wipers are positioned on opposite sides of the belt at a wiping location between the idler roll and the nip rolls for removing belt adhered hydrocarbons. A receptacle is positioned to receive wiper removed hydrocarbons. The receptacle includes a heat chamber and a heat transfer wall for transferring heat from the chamber to heat collected hydrocarbons. The wipers skew the belt to cause the formation of a containment draining depression upstream from the wipers. A process of removing hydrocarbons of high viscosity from a body of water is also disclosed.

24 Claims, 4 Drawing Sheets

5,645,733

HYDROCARBON REMOVAL APPARATUS AND METHOD

FIELD OF THE INVENTION

This invention relates to a method and apparatus for separating hydrocarbons from water and more particularly to a novel and improved belt type hydrocarbon skimmer which is especially suited for removing grease and other heavy hydrocarbons from the surface of water.

BACKGROUND OF THE INVENTION

Belt type oil skimmers, such as that described in U.S. Pat. No. 5,378,371, issued Jan. 3, 1995, to the assignee of this patent and entitled Method of Removing Oil From Water and Apparatus Therefore, (the '371 Patent) are well known. While oil skimmers of the belt type have been successfully used for removing oil from the surface of water, they have been unsuited for removing highly viscous hydrocarbons, such as grease, from bodies of water.

Most, if not all, commercially successful belt type oil skimmers, have used a single driven head pulley, an endless belt, and in the usual case a tail pulley which is at least partially immersed in the body of water from which contaminating hydrocarbons are being removed. Surface oils adhere to a descending reach of the belt and are thence carried upwardly by an ascending reach of the belt to a wiper location. Typically the wiper location is near the top of the descending reach and near the head pulley.

When attempts have been made to use the typical prior belt type oil skimmer to remove highly viscous hydrocarbons, such as grease, from bodies of water, the result each time has been a failed attempt. Unlike low viscosity oil, the grease, will not flow over the wipers and drop into a collection vessel below the wiper, but rather tends to collect against the wiper and the belt and "ball up". To the extent the grease does fall into a collection trough below the wiper, it tends to stay there rather than flow out and in a short time the collection trough is filled such that the entire skimmer is rendered useless for its intended purpose.

While there have been proposals for variations of drive systems for oil skimmer belts, such as training the belt over a roll, thence along a horizontal span to a pair of pinch rolls before traversing into the descending reach, no provisions are made which render such skimmers useful for greases which only flow at higher temperatures and other high viscosity hydrocarbon removal.

One proposal would use a conveyor with projecting spikes to remove tar and, allegedly, oil from the surface of a body of water. The tar adheres to the spikes as the conveyor belt is passed into and out of a body of water having tar and possibly other hydrocarbons on its surface. As the spikes pass through the tar, and perhaps other hydrocarbons, the hydrocarbons adhere to the spikes. As the belt commences its downward travel from the top of the conveyor, the spikes pass between a row of tines which are heated and effective to at least partially remove the tar from the spikes. It is proposed that heating of the tar would produce molten tar which could flow to a collection tank.

SUMMARY OF THE INVENTION

With the novel and improved skimmer of this invention, heavy hydrocarbons are readily removed from bodies of water. The preferred apparatus has a coacting pair of nip rolls at least one of which is driven. The nip rolls drivingly engage an endless, smooth belt immediately above a descending reach of the belt.

An idler pulley or roll is mounted in spaced relationship with the nip or pinch rolls for rotation about an axis paralleling the axes of the pinch rolls. The idler pulley supports the belt immediately above its ascending reach. The idler pulley coacts with the pinch rolls to delineate a generally horizontal hydrocarbon removal span.

A pair of wipers are mounted on the frame between the idler pulley and the pinch rolls and on opposite sides of the generally horizontal span. When the improved apparatus is mounted such that the idler pulley and pinch rolls are rotating about horizontal axes, an imaginary plane tangent to the idler roll and the lower one of the pinch rolls extends above a recessed section of the span as the span passes through a wiping station where hydrocarbons are removed. To accomplish this, again assuming horizontal orientation, an upper wiper preferably has a wiping surface for skimming the hydrocarbons from a top surface of the belt at least in part at a location below the imaginary plane. In addition, the wiping surface is preferably angled downwardly in a direction outwardly from a cantilever mounting on the frame. An undersurface wiper has a wiping surface that is essentially at the imaginary plane and, like the upper wiper, is angled across the belt span at an acute angle with respect to the path of travel.

With the wipers so oriented and located, the belt is skewed creating a depressed portion of the span immediately upstream of the top wiper. The depressed portion slopes downwardly in a direction away from the frame in a trough like configuration. This configuration causes the wiped materials to flow over the edge of the belt span remote from the frame and into a collection receptacle below. The receptacle has base and side walls which define a collection space for the wiped materials.

A jacket is under and spaced from the base wait and preferably around the side walls to delineate a heat chamber between the jacket and the base and side walls. The chamber, when the unit is in use, is heated either by steam or electric resistance heaters. This elevates the temperature of hydrocarbons collected in the space, reducing the viscosity of the collected materials, so that the heated materials will gravity flow out of the receptacle for appropriate disposal.

The coacting nip rolls preferably each have a surface defined by a circumferentially endless elastomeric material. Grooves are formed in each surface. The grooves define the perimeters of belt engaging parts. These belt engaging parts frictionally engage the surface of a freshly wiped belt a short distance downstream from the wiping station for positively driving the belt in its endless path. The path extends from the nip rolls into and thence out of the body of water from which contaminates are being removed, up over the idler roll, through the wiping station and back to the nip rolls.

Accordingly, the objects of the invention are to provide a novel and improved belt skimmer adapted to remove highly viscous hydrocarbon contaminates from bodies of water and a method of removing such contaminates.

IN THE DRAWINGS

Drawing Description

DESCRIPTION OF THE PREFERRED EMBODIMENT

Figure 1:
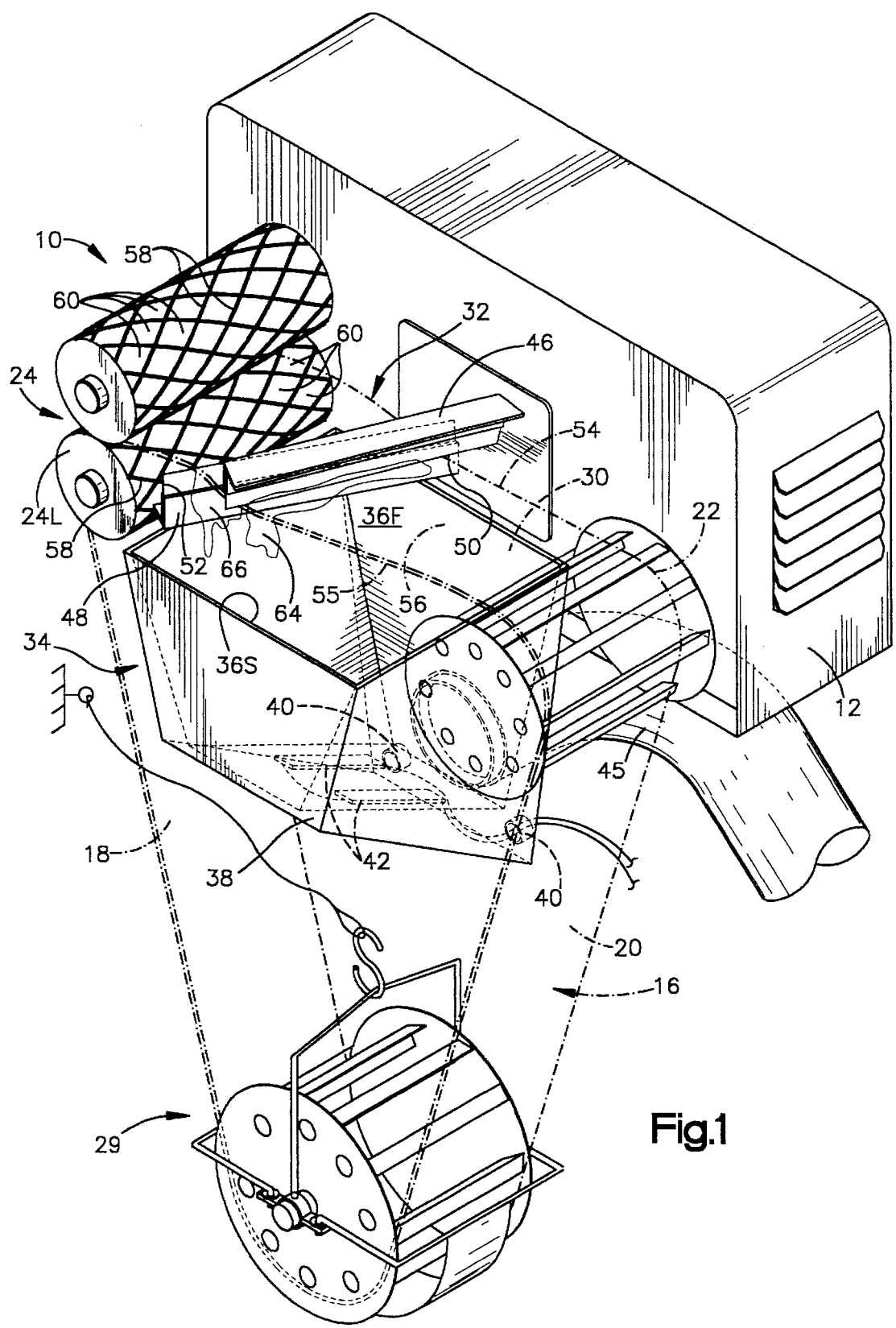
FIG. 1 is a perspective view of the skimmer of this invention.

Referring to the drawings and to FIG. 1 in particular, the hydrocarbon skimmer of this application is shown generally at 10. The skimmer 10 includes a housing and frame structure 12. In use the housing and frame structure 12 is suitably supported above a body of water 15.

An endless belt 16 is supported by the housing and frame structure 12. The belt 16 includes a descending reach 18 which travels downwardly into the body of water 15 when the skimmer is in use. As the descending reach 18 enters the water, hydrocarbon contaminates on the surface of the water adhere to the belt. An ascending reach 20 of the belt 16 rises out of the body of water carrying adhered to contaminates with it.

An idler pulley or roll 22 is carried by the housing and frame structure for rotation about a horizontal axis when the skimmer is in use. The idler roll has a plurality of circumferentially spaced, axially extending, legs 23 for engaging and supporting the belt 16. A pair of coacting nip rolls 24 are also carried by the housing and frame structure. The nip rolls are generally cylindrical in configuration and respectively mounted on the housing and frame structure 12 for rotation about axes paralleling the axis of the idler roll 22.

A drive motor 25 is provided. The output of the motor drives a gear box 26. A lower one 24L of the nip roll pair is drivingly connected to the output of the gear box 26 via a drive chain 28. The nip rolls are interconnected by spur gears (not shown) so that both are driven.

Depending on the application, the belt 16 may or may not support a tail pulley 29. In some applications the spacings of the idler and nip rolls 22, 24 coupled with the length of the belt provides a skimmer which is adequate to allow the belt to suspend of its own weight and maintain suitable spacing between the descending and ascending reaches 18, 20. Alternately, where a tail pulley is provided it preferably will be of the type described and claimed in the '371 Patent. As is taught in that patent, the tail pulley will be preferably equipped with a tether and a catch pad.

The belt 16 includes a generally horizontal span 30 which extends between the idler roll 22 to the nip roll pair 24. The span 30 extends through a wiping station shown generally at 32. Residues wiped from the span 30 in the wiping station 32 are collected in a receptacle 34 positioned below the wiping station 32.

Figure 3:
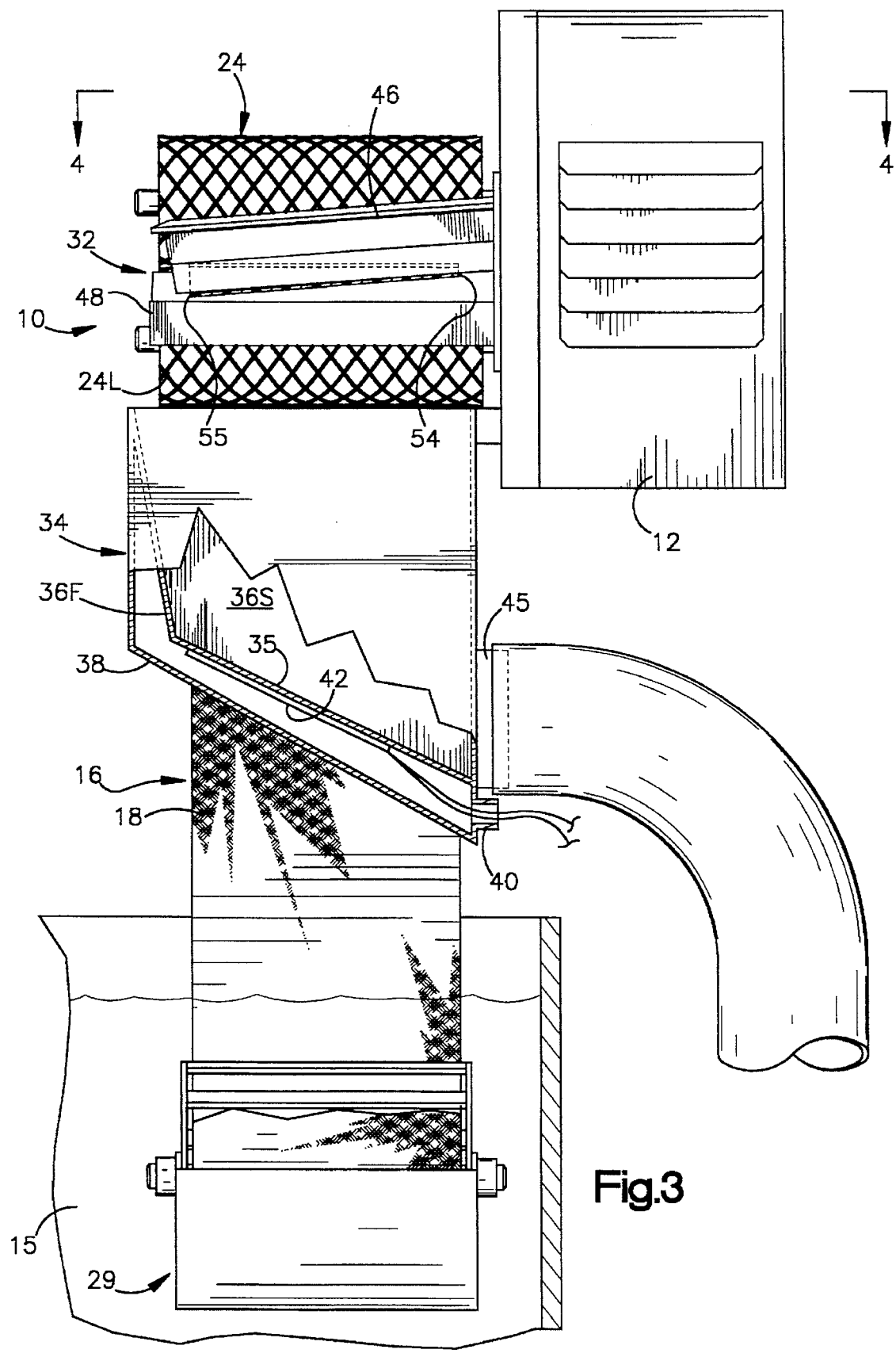
FIG. 3 is a partially sectioned and partially elevational view of the skimmer as seen from the planes indicated by the line 3—3 of FIG. 2; and, FIG. 4, is a sectional view of a housing and otherwise a top plan view of the skimmer as seen from the plane as indicated by the line 4—4 of FIG. 3.
Figure 4:
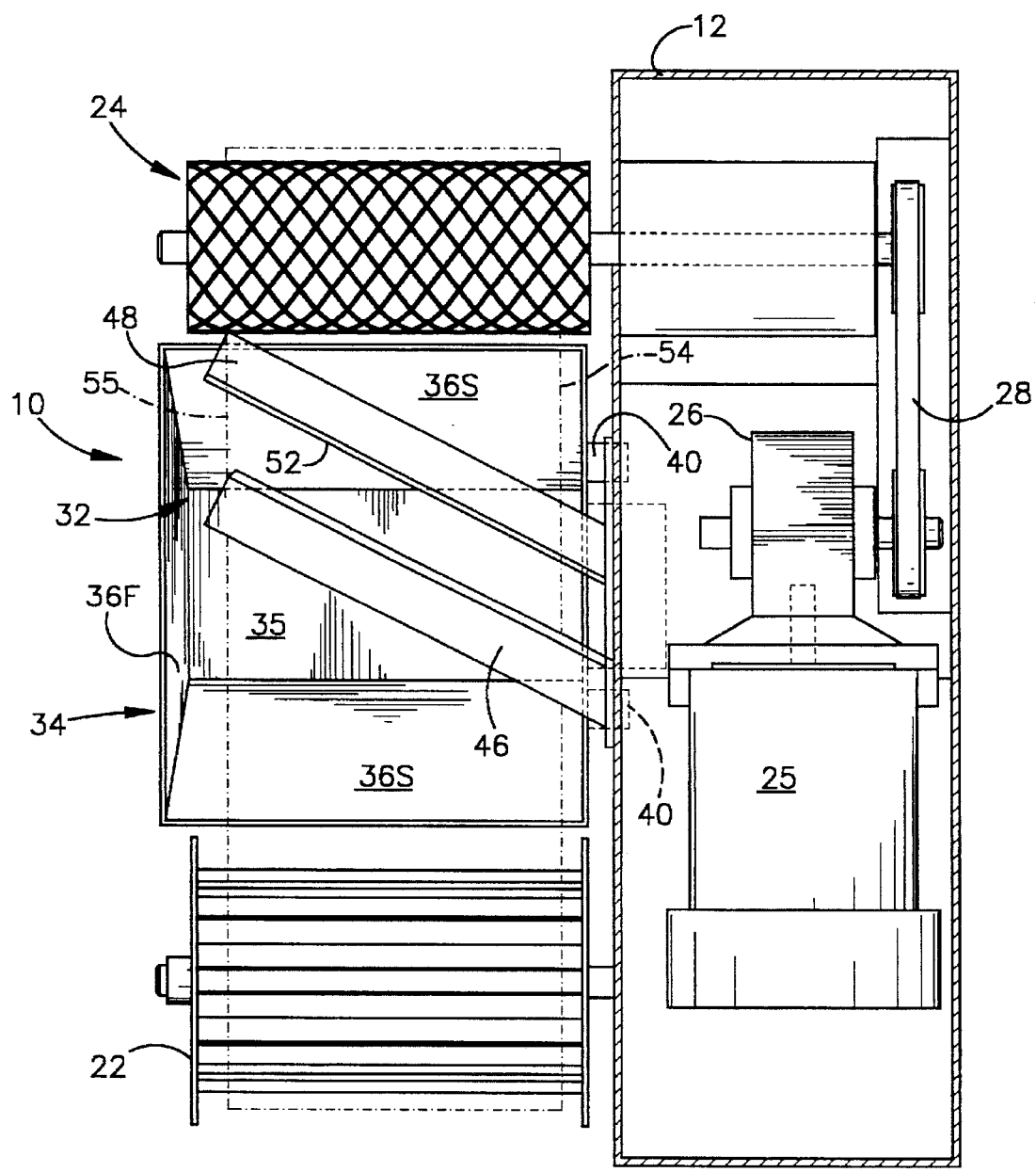

Referring now to FIGS. 3 and 4, the receptacle includes a base wall 35, a front wall 36F, a back wall 36B, and upstanding side walls 36S, which delineate a collection space for residues skimmed from the span 30. An outer jacket 38 partially surrounds the collection space delineating a heat chamber between the jacket and the base, front and side walls 35, 36.

Figure 2:
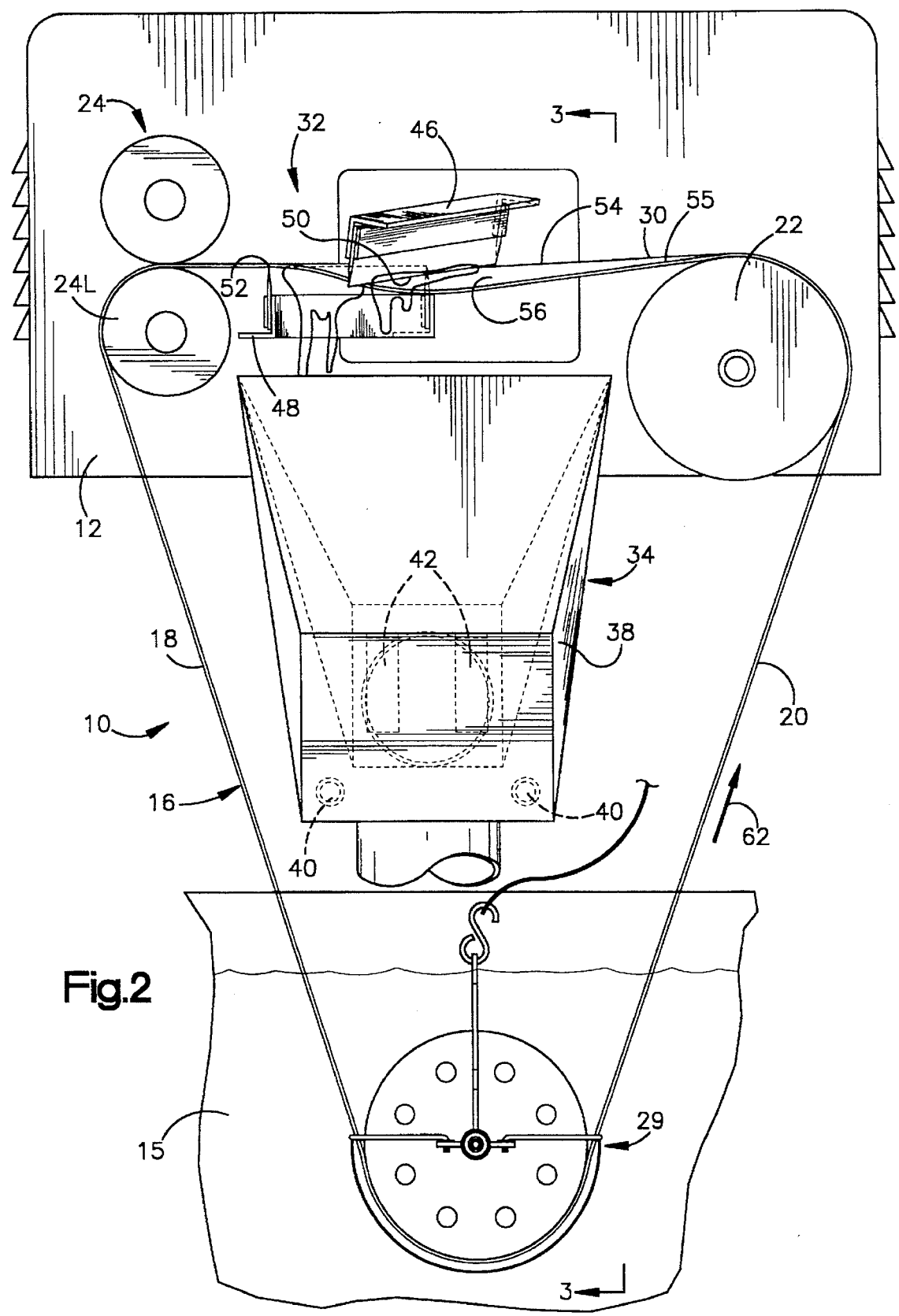
FIG. 2 is a front elevation view of the skimmer of the present invention.

A pair of couplings 40 are carried by the jacket 38 and communicate with the jacket delineated chamber. A source of steam may be coupled to one of the couplings 40 to introduce steam into the chamber and thereby heat materials within the receptacle space. When a source of steam is connected to one of the couplings 40, the other coupling functions as an outlet. Alternatively, dual strip electric heaters 42 are secured to the underside of the base wall 35 and positioned in the heating chamber. A thermostat 44, FIG. 2, is coupled to the heaters 42 to modulate the energization of the heaters and control the temperature within the collection space. Where steam is supplied as an alternate or supplemental heat source, the source of steam will also be controllably coupled to the thermostat 44.

The rolls 22, 24 and the belt 16 are considered to be at the front of the machine. As is best shown in FIG. 3, the base wall 35, which delineates the base of the contaminate collection space, is sloped downwardly and rearwardly from the front of the machine to a receptacle outlet 45. As grease and other heavy hydrocarbons are heated, their viscosities are reduced and once reduced the heated materials flow readily through the outlet 45 for suitable disposal or recycling.

One of the outstanding features of the invention is provided at the wiping station 32. Upper and lower wipers 46, 48 are provided. The wipers 46, 48 are cantilever supported by the structure 12. Each of the wipers extends at approximately 60° from the frame and at about 30° with the path of belt travel, such that upper and lower wiper surfaces 50, 52 respectively engage the span 30 in essential line contact in an angular relationship across the span. Engagement of the surfaces 50, 52 near an inner edge 54 of the span 30 is upstream from corresponding engagements of the wiping surfaces near an outer edge 55 of the span.

The upper wiper is also angled downwardly in a direction away from the structure 12, such that the span is depressed near its outer edge 55 preferably to an elevation lower than the inner edge 54 when the skimmer is in use and the axes of the rolls 22, 24 are horizontal. In addition, the span contact of the wiper surface 52 is preferably at least in part higher than the span contact of the wiping surface 50. Expressed another way, at least a part of the wiping edge 50 is preferably below an imaginary plane tangent to the idler roller 22 and the lower nip roll 24L.

The downward angular orientation of the upper wiper relative to the lower wiper skews the span 30 to produce a trough like depression 56. The combination of the wiper action and the skewing of the span 30 produces a snow plow like action which causes grease and other heavy hydrocarbons to work their way outwardly across the span and flow from the trough 56 and over the outer edge 55 into the receptacle 34 below. This flowing action of heavy hydrocarbons is in sharp contrast to the "balling up" of grease and other heavy hydrocarbons when users of prior skimmers of the belt type have sought to remove heavy hydrocarbons from bodies of water.

Another feature of the invention is provided by the novel and improved nip rolls 24. Each of the nip rolls 24 has at least an outer, endless elastomeric portion delineating the rolls' outer generally cylindrical belt engagement surfaces. Each surface includes grooves 58, FIG. 1, arranged in a diamond pattern. The grooves 58 delineate the perimeters of belt engagement parts 60. When the engagement parts 60 engage the belt, any residual surface fluids tend to be squeegeed into the grooves 58, assuring positive driving engagement of the belt by the nip rolls 24.

Operation

In use, the housing and frame structure is mounted such that the axes of rotation of the rolls 22, 24 are horizontal. The belt 16 depends into the body of water 15 with its lower portion, and the tail pulley 29 if used, at least partially submerged in the water. The heating source of the receptacle 34 is energized and heat is applied until the receptacle is at a desired operating temperature. Once the unit is up to operating temperature, the motor 25 is energized and the belt is driven in the direction indicated by arrow 62 of FIG. 2.

As the descending reach 18 enters the water 15, hydrocarbons on the water surface adhere to the belt. The ascending reach 20 carries adhered to hydrocarbons up and over the idler roll 22 which, due to its spaced leg construction, picks up only minimal quantities of the adhered to hydrocarbons.

The span 30 passes through the wiper station 32, as the span 30 travels from the idler to roll 22 to the nip rolls 24. Action of the wiping surfaces 50, 52 skews the span 30 to produce the trough 56. Hydrocarbon residues indicated at 64 in FIG. 1 are stripped from the span 30 by the upper wiper 46 in a plow like action. The residues 64 fall into the receptacle 34. Similarly, the lower wiper 48 strips residues indicated at 66 which also fall into the receptacle. Material collected in the receptacle is heated by heat energy transferred from the jacket defined chamber through the walls 35, 36 until the viscosity is lowered to the point where the accumulated materials will flow from the receptacle space through the outlet 45 for suitable disposal.

Although the invention has been described in its preferred form with a certain degree of particularity, it is understood that the present disclosure of the preferred form has been made only by way of example and that numerous changes in the details of construction, operation and the combination and arrangement of pans may be resorted to without departing from the spirit and the scope of the invention as hereinafter claimed.

I claim:

1. An oil and grease skimmer for removing hydrocarbon contaminants from surfaces of bodies of water, the skimmer comprising:
   a) a housing and frame structure for positioning above a contaminated body of water;
   b) an idler pulley rotatively mounted on the structure for rotation about a generally horizontal axis when the skimmer is in use;
   c) a coacting nip roll pair carried by the structure in spaced relationship with the idler pulley for rotation about axes parallel with one another and the idler pulley axis;
   d) an endless belt trained over the idler pulley and between the nip rolls;
   e) the belt having a descending pick up reach extending downwardly from the nip rolls when the skimmer is in use, the belt also having an ascending reach depending from the idler pulley when the skimmer is in use;
   f) a pair of wipers carried by the structure and positioned on opposite sides of the belt at a wiping location between the idler roll and the nip rolls, the wipers being positioned to skew the belt and force one belt side edge lower than the other, the wipers also being for removing belt adhered hydrocarbons from the belt as the belt passes between the wipers;
   g) a drive train operatively coupled to both of the nip rolls for rotatively driving each of the nip rolls and through frictional engagement between each of the nip rolls and the belt also driving the belt;
   h) a receptacle delineating a collection space positioned to receive wiper removed hydrocarbons; and,
   i) the receptacle including a thermostatically controlled heat chamber and a heat transfer wall between the chamber and the space for transferring heat from the chamber to the space to heat hydrocarbons in the space.

2. The skimmer of claim 1 further including a tail pulley rotatively supported by the belt.

3. The skimmer of claim 1 further including the wipers having wiper belt engaging surfaces positioned such that an upstream one of the wipers depresses the belt relative to the other wiper both longitudinally and transversely of an angle with the horizontal whereby to cause the formation of a containment draining depression upstream from the upstream wiper when the skimmer is in use.

4. The skimmer of claim 1 wherein each of the pinch rolls includes an endless elastomeric portion delineating perimetral belt engaging roll surface parts and recesses between at least certain of the parts.

5. The skimmer of claim 1 wherein an electric heater is disposed in the chamber.

6. An oil and grease skimmer for removing hydrocarbon contaminants from surfaces of bodies of water, the skimmer comprising:
   a) a frame including mounting structure for positioning above a contaminated body of water;
   b) a spoke type idler pulley rotatively mounted on the frame for rotation about a generally horizontal axis when the skimmer is in use;
   c) a coacting nip roll pair rotatively mounted on the frame in spaced relationship with the idler pulley for rotation about axes parallel with one another and the idler pulley axis;
   d) an endless belt trained over the idler pulley and between the nip rolls;
   e) the belt having a descending pick up reach extending downwardly from the nip rolls when the skimmer is in use, the belt also having an ascending reach depending from the idler pulley when the skimmer is in use;
   f) a pair of wipers carried secured to the frame and positioned on opposite sides of the belt at a wiping location between the idler rolls and the nip roll, the wipers being positioned to skew the belt and establish a containment draining depression slanting downwardly from one side edge to the other for removing belt adhered hydrocarbons from the belt as the belt passes between the wipers;
   g) a drive including a motor and a gear train operatively coupled to at least one of the nip rolls for rotatively driving the at least one nip roll and through frictional engagement between the at least one nip roll and the belt also driving the belt;
   h) a receptacle delineating a collection space carried by the frame and positioned to receive wiper removed hydrocarbons; and,
   i) the receptacle including a thermostatically controlled heat chamber and a heat transfer wall between the chamber and the space for transferring heat from the chamber to the space to heat hydrocarbons in the space.

7. The skimmer of claim 6 further including a tail pulley rotatively supported by the belt.

8. The skimmer of claim 6 wherein each of the pinch rolls includes an endless elastomeric portion delineating perimetral belt engaging roll surface parts and recesses between at least certain of the parts.

9. The skimmer of claim 6 wherein an electric heater is disposed in the chamber.

10. The skimmer of claim 6 further including the wipers having wiper belt engaging surfaces positioned such that an upstream one of the wipers depresses the belt relative to the other wiper whereby to cause the formation of the containment draining depression upstream from the upstream wiper when the skimmer is in use.

11. A process of removing hydrocarbons of high viscosity from a body of water comprising:
   a) suspending an endless belt from a belt drive mechanism and thereby positioning a lower portion of the belt in a body of water;

b) operating the belt drive mechanism to cause a depending reach of the belt to enter the water and collect hydrocarbons on surfaces of the belt, the collected hydrocarbons being from a floating quantity of hydrocarbons on the surface of the water;

c) continuing to operate the drive mechanism to bring an ascending reach of the belt bearing collected hydrocarbons to a wiping station;

d) at the wiping station, wiping collected hydrocarbons from the belt while skewing the belt such that one belt side edge is lower than the other to provide a draining depression to cause the hydrocarbons to flow off the belt into a collection space and collecting such wiped hydrocarbons in the collection space; and, e) causing collected hydrocarbons to gravity flow from the space by heating collected hydrocarbons in the space to reduce the viscosity of the collected hydrocarbons while controlling the heating to avoid overheating of the collected hydrocarbons.

12. The process of claim 11 further including performing the drive operating step with a coacting pair of driven rolls each having an elastomer defined grooved surface.

13. The process of claim 11 further including the step of performing the wiping step on a generally horizontal section of the belt.

14. A process of removing hydrocarbons of high viscosity from a body of water comprising:

a) suspending an endless belt from a belt drive mechanism and thereby positioning a lower portion of the belt in a body of water;

b) operating the belt drive mechanism to cause a depending reach of the belt to enter the water and collect hydrocarbons on surfaces of the belt, the collected hydrocarbons being from a floating quantity of hydrocarbons on the surface of the water;

c) continuing to operate the drive mechanism to bring an ascending reach of the belt bearing collected hydrocarbons to a wiping station;

d) at the wiping station, wiping collected hydrocarbons from the belt and collecting such wiped hydrocarbons in a collection space;

e) causing collected hydrocarbons to gravity flow from the space by heating collected hydrocarbons in the space to reduce the viscosity of the collected hydrocarbons while controlling the heating to avoid overheating of the collected hydrocarbons; and, f) causing the wiping action to skew the belt to force one belt side edge lower than the other and form a hydrocarbon draining depression, draining the hydrocarbons laterally from the belt upstream from the wiping station.

15. An oil and grease skimmer for removing hydrocarbon contaminants from surfaces of bodies of water, the skimmer comprising:

a) a housing and frame structure for positioning above a contaminated body of water;

b) an idler pulley rotatively mounted on the structure for rotation about a generally horizontal axis when the skimmer is in use;

c) a coacting nip roll pair carried by the structure in spaced relationship with the idler pulley for rotation about axes parallel with one another and the idler pulley axis;

d) an endless belt trained over the idler pulley and between the nip rolls;

e) the belt having a descending pick up reach extending downwardly from the nip rolls when the skimmer is in use, the belt also having an ascending reach depending from the idler pulley when the skimmer is in use;

f) a pair of wipers carried by the structure and positioned on opposite sides of the belt at a wiping location between the idler roll and the nip rolls, the wipers including wiping surfaces for removing belt adhered hydrocarbons from a span of the belt as the span passes between the wipers;

g) the belt span being generally horizontal when the skimmer is in use, one of the wipers being an upper wiper having its wiping surface sloping from the horizontal and engaging a top of the span when the skimmer is in use, the other of the wipers being a lower wiper with its surface engaging an under surface of the span at an elevation of sufficient height relative to the upper wiper span engagement such that the wiper surfaces skew the span and create a hydrocarbon draining trough upstream of the wiping location;

h) a drive train operatively coupled to at least one of the nip rolls for rotatively driving the at least one nip roll and through frictional engagement between the at least one nip roll and the belt also driving the belt; and, i) a heatable receptacle delineating a collection space positioned to receive wiper removed hydrocarbons.

16. The skimmer of claim 15 wherein the wipers are cantilever mounted on the structure.

17. The skimmer of claim 15 wherein the upper wiper surface is the first wiper surface and wherein the upper wiper surface slopes downwardly in a direction away from the structure.

18. The skimmer of claim 15 wherein the upper wiper surface is at an obtuse angle with respect to a path of span travel such that the upper wiper surface engages the span near a span edge nearest the structure at a location upstream from an upper wiper surface span engagement at a location near a span edge remote from the structure.

19. A process of removing hydrocarbon contaminants from a body of water at least some of which contaminants are of relatively high viscosity comprising:

a) suspending an endless, smooth surfaced belt from a support into a body of water;

b) driving at least one of a pair of nip rolls frictionally engaging opposite faces of the belt to lower a descending reach into the water and thereby collect hydrocarbon contaminants on the belt faces;

c) training an ascending reach of the belt over an idler roll located in spaced relationship with the nip rolls and thereby establishing a generally horizontal belt span moving along a span path;

d) positioning a pair of wipers across the span path;

e) removing collected hydrocarbons from the belt faces by establishing wiping contact between the belt faces in the span and the pair of wipers, each of the wipers having a wiping surface engaging a respective associated belt face along a line of contact at an acute angle with the path; and, f) removing collected contaminants from an upper face of the span by skewing the span such that one belt side edge is lower than the other to form a drainage recess in the span upstream from the wipers by relatively positioning the wipers such that an upper one of the wipers contacts an upper surface of the span in a region upstream from a region where a lower one of the wipers contacts a lower surface of the span such that the span in the region contacted by the upper wiper is at least in part at an elevation below the contact of the lower wiper with the lower surface.

20. A process of removing hydrocarbons of high viscosity from a body of water comprising:

a) extending a hydrocarbon pickup mechanism from a drive mechanism to and into a body of water;

b) operating the drive mechanism to cause the pickup mechanism to collect hydrocarbons from a floating quantity of hydrocarbons on the surface of the water;

c) continuing to operate the drive mechanism to bring an ascending portion of the pickup mechanism bearing collected hydrocarbons to a hydrocarbon removal station;

d) at the removal station, removing collected hydrocarbons from the pickup mechanism by skewing the belt such that one belt side edge is lower than the other to form a hydrocarbon draining depression and collecting such removal hydrocarbons in a collection space; and, e) causing collected hydrocarbons to gravity flow from the space by heating collected hydrocarbons in the space to reduce the viscosity of the collected hydrocarbons while controlling the heating of the hydrocarbons to avoid overheating.

21. The process of claim 20 wherein the pickup mechanism is an endless belt.

22. The process of claim 21 further including performing the drive operating step with a coacting pair of rolls at least one of which is a driven roll having an elastomer defined grooved surface.

23. The process of claim 21 wherein the hydrocarbon removal is accomplished with at least one wiper.

24. The process of any of claim 23 wherein the hydrocarbon draining depression is formed upstream from the wiping station.

* * * * *